US010422372B2

(12) United States Patent
Cox (10) Patent No.: US 10,422,372 B2
(45) Date of Patent: Sep. 24, 2019

(54) ROTATABLE BUSHING (71) Applicant: MF IP Holding, LLC, West Jordan, UT (US)

(72) Inventor: Christopher Paul Cox, West Jordan, UT (US)

(73) Assignee: MF IP Holding, LLC, West Jordan, UT (US)

( * ) Notice: Subject to any disclaimer, the term of this patent is extended or adjusted under 35 U.S.C. 154(b) by 0 days.

(21) Appl. No.: 15/795,969

(22) Filed: Oct. 27, 2017

(65) Prior Publication Data
US 2019/0128320 A1 May 2, 2019

(51) Int. Cl.
*F16C 17/02* (2006.01)
*F16C 27/06* (2006.01)
*F16C 11/06* (2006.01)
*F16F 1/38* (2006.01)
(Continued)

(52) U.S. Cl.
CPC .......... *F16C 17/02* (2013.01); *F16C 11/0676* (2013.01); *F16C 11/083* (2013.01); *F16C 27/06* (2013.01); *F16C 27/063* (2013.01); *F16C 33/106* (2013.01); *F16F 1/38* (2013.01); *F16C 2223/30* (2013.01); *F16C 2326/05* (2013.01)

(58) Field of Classification Search
CPC . F16C 11/0614; F16C 11/0676; F16C 11/083; F16C 17/02; F16C 27/06; F16C 27/063; F16C 33/02; F16C 33/106; F16C 33/20; F16C 2326/05; F16C 2223/30; F16F 1/38
USPC ....... 384/114, 151, 276, 280, 282, 297, 397, 384/416, 273, 290, 295; 267/141.3, 267/268–269, 270; 403/164, 222, 225, 403/228
See application file for complete search history.

(56) References Cited

U.S. PATENT DOCUMENTS 2,728,593 A * 12/1955 Hutton ................. F16C 27/063
403/224
3,042,394 A * 7/1962 Bliss ....................... B60G 7/02
267/269
(Continued)

FOREIGN PATENT DOCUMENTS

WO WO-2015012966 A1 * 1/2015 ............. B60G 7/001

OTHER PUBLICATIONS

"Duroflex Joints and Replacement Bushings: Suspension Builders Parts," MetalCloak, a division of Armored Works, LLC, <http://www.metalcloak.com/Jeep-Suspension-Builders-Parts-s/235.htm> [retrieved Jan. 23, 2018], 4 pages.
(Continued)

*Primary Examiner* — Marcus Charles
(74) *Attorney, Agent, or Firm* — Christensen O'Connor Johnson Kindness PLLC (57) ABSTRACT

A rotatable bushing for use in automotive suspension, steering, and other suitable joints is provided. The rotatable bushing includes a housing, an elastomeric portion engaging the outer surface of the housing, and a sleeve positioned within the housing. The sleeve is configured to rotate with respect to the housing and generally includes a central bore for receiving a rod or fastener therethrough. The elastomeric portion is configured to deform such that the sleeve is moveable in at least one of an axial direction and a radial direction with respect to an outer surface of the elastomeric portion.

20 Claims, 4 Drawing Sheets

(51) Int. Cl.
*F16C 33/10* (2006.01)
*F16C 11/08* (2006.01)

(56) References Cited

U.S. PATENT DOCUMENTS

| | | | | |
|---|---|---|---|---|
| 3,239,286 A * | 3/1966 | Harrison | ............... | F16F 1/38 384/222 |
| 3,392,971 A * | 7/1968 | Herbenar | ............... | B60G 7/02 267/268 |
| 4,619,544 A * | 10/1986 | Laidely | ............... | B60G 5/02 16/2.1 |
| 4,809,960 A * | 3/1989 | Kakimoto | ............... | B60G 7/00 248/634 |
| 5,058,867 A * | 10/1991 | Hadano | ............... | B60G 7/005 248/635 |
| 5,224,783 A * | 7/1993 | Schmidt | ............... | F16F 1/38 384/222 |
| 5,540,420 A * | 7/1996 | Luzsicza | ............... | F16C 27/063 267/141.1 |
| 5,961,219 A * | 10/1999 | Maughan | ............... | F16F 1/38 384/220 |
| 6,695,480 B1 * | 2/2004 | Ramsay | ............... | F04D 29/047 384/110 |
| 7,220,056 B2 * | 5/2007 | Kubota | ............... | B62D 1/16 384/215 |
| 7,398,984 B2 | 7/2008 | Tucker | | |
| 7,461,977 B2 * | 12/2008 | Davis | ............... | A01D 34/76 384/147 |
| 7,665,747 B2 * | 2/2010 | Arlt | ............... | B62D 3/12 280/93.514 |
| 8,770,884 B2 * | 7/2014 | Erdogan | ............... | B60G 7/005 403/132 |
| 8,783,702 B2 * | 7/2014 | Lee | ............... | B60G 7/02 280/124.134 |
| 8,985,604 B2 * | 3/2015 | Hopson | ............... | B60G 7/005 280/124.134 |
| 9,541,123 B2 * | 1/2017 | Broeker | ............... | F16C 11/0614 |
| 2007/0009757 A1 * | 1/2007 | Takayama | ............... | B22F 1/0003 428/644 |
| 2009/0134292 A1 * | 5/2009 | Kubat | ............... | F16F 3/093 248/222.51 |
| 2010/0109346 A1 * | 5/2010 | Dieling | ............... | B64C 1/1407 292/90 |

OTHER PUBLICATIONS

"Synergy Dual Durometer Bushing (DDB) Series," Poly Performance Inc., <https://www.polyperformance.com/synergy-dual-durometer-teflon-ddt-lined-bushing-series> [retrieved Jan. 23, 2018], 6 pages.

* cited by examiner

ROTATABLE BUSHING

BACKGROUND

Bushings are generally used to provide non-rigid mounting points on various types of machinery where having compliance in one or more directions is desired. One exemplary use for bushings is in joints of automotive suspension and steering systems, where the bushings allowing movement in a radial direction at a mounting point by compression of an elastomeric portion of the bushing. In the example of vehicle suspension and steering systems, bushings having an elastomeric portion can provide a quieter, more comfortable ride, while maintaining the designed position of the suspension geometry or the steering linkage geometry during a variety of static and dynamic scenarios.

In some mounting configurations, the bushing is positioned in a joint in the system by insertion through an eye loop at the end of a rod or linkage, such that the bushing allows at least movement along the length of the rod or linkage by compression of the elastomeric portion of the bushing. However, in certain configurations, as a result of the system geometry, the rod or linkage may also impart a rotational force to the bushing, such as when a vehicle suspension is in a high-articulation condition. In conventional bushings, the elastomeric portion is coupled to an inner housing, which generally includes an aperture for receiving a fastener. In these conventional bushed joints, installation of the fastener effectively fixes the inner housing of the bushing in both the radial and axial directions, such that a rotation of the rod or linkage causes the elastomeric portion to wrap (i.e., twist an outer surface of the elastomeric portion with respect to an inner surface of the elastomeric portion), a condition commonly leading to premature failure of the elastomeric portion of the bushing.

Therefore, a need exists for an improved bushing resistant to the detrimental effects of wrap of the elastomeric portion. Embodiments of the present disclosure are directed to fulfilling this and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a bushing is provided. The bushing generally includes a housing having an aperture extending therethrough along an axis, the housing having an outer surface extending circumferentially about the axis; an elastomeric portion engaging the outer surface of the housing; and a first sleeve retained in a first axial direction within the aperture and being rotatable about the axis, the first sleeve having a first central bore extending in the direction of the axis, wherein the first sleeve may be moveable in at least one of an axial direction and a radial direction with respect to an outer surface of the elastomeric portion.

In accordance with another embodiment of the present disclosure, a rotatable bushing is provided. The rotatable bushing generally includes a housing having an aperture extending therethrough along an axis, the housing having an outer surface extending circumferentially about the axis; an elastomeric portion engaging the outer surface of the housing; a first sleeve retained in a first axial direction within the aperture and being rotatable about the axis, the first sleeve having a first central bore extending in the direction of the axis, wherein the first sleeve may be moveable in at least one of an axial direction and a radial direction with respect to an outer surface of the elastomeric portion; and a joining member having an eye loop surrounding an exterior surface of the elastomeric portion, wherein rotation of the first sleeve may substantially prevent rotation of an interior surface of the elastomeric portion relative to the exterior surface.

In accordance with any of the embodiments described herein, the rotation of the first sleeve with respect to the housing may substantially prevent rotation of an inner surface of the elastomeric portion relative to the outer surface.

In accordance with any of the embodiments described herein, the bushing may further include a second sleeve having a second central bore, the second sleeve rotatably disposed within the aperture and substantially retained in a second axial direction opposite the first axial direction.

In accordance with any of the embodiments described herein, the first sleeve may further include a first shoulder portion, and the housing comprises a first flange positioned within the aperture, the first shoulder abutting the first flange to retain the first sleeve in the first axial direction.

In accordance with any of the embodiments described herein, the first and second central bores may be configured to receive a fastener shank therethrough such that when assembled, the first shoulder portion and the second shoulder portion retain the fastener shank in both axial directions.

In accordance with any of the embodiments described herein, the bushing may further include a sealing ring positioned between the first sleeve and the housing near a distal end of the first sleeve.

In accordance with any of the embodiments described herein, the housing may further include a circumferential trough configured to retain a lubricant.

In accordance with any of the embodiments described herein, the sleeve may further include an axial trough adjacent the circumferential trough, the axial trough configured to distribute the lubricant along the length of the first sleeve.

In accordance with any of the embodiments described herein, the elastomeric portion may comprise a material selected from the group consisting of natural rubber, synthetic rubber, ethylene propylene diene monomer, polymer, and polyurethane.

In accordance with any of the embodiments described herein, the housing may comprise a material selected from the group consisting of bearing steel, stainless steel, high-carbon chromium bearing steel, carbon alloy steel, iron, titanium, anodized aluminum, and plastic.

In accordance with any of the embodiments described herein, the first sleeve may comprise a material selected from the group consisting of bearing steel, stainless steel, high-carbon chromium bearing steel, carbon alloy steel, iron, titanium, anodized aluminum, and plastic.

In accordance with any of the embodiments described herein, the first sleeve may further include a first shoulder portion, and the housing may further include a first flange positioned within the aperture, the first shoulder abutting the first flange to retain the first sleeve in the first axial direction, and wherein the second sleeve further may include a second shoulder portion, and the housing may include a second flange positioned within the aperture, the second shoulder abutting the second flange to retain the second sleeve in the second axial direction.

In accordance with any of the embodiments described herein, the inner surface of the aperture of the housing and an outer surface of the first sleeve may be coated with molybdenum disulfite.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to bushings that prevent wrapping deformation of an elastomeric portion by rotation of a mounting sleeve within a housing. Embodiments of the present disclosure are generally directed to bushings of the type used in automotive applications; however, the bushings disclosed herein are suitable for use in any configuration or system requiring a bushed joint. Embodiments of the rotatable bushing are generally suitable for automotive steering and suspensions systems, among other systems. Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A bushing generally includes a central bore configured for receiving a fastener, (e.g., a bolt), therethrough. The central bore is positioned within a rigid inner housing such that a desired torque can be applied to the fastener to generate a designed clamping force, while not crushing or deforming the bushing. The rigid housing is surrounded by a compliant portion generally manufactured from an elastomer to provide the compliance of the bushed joint. When the bushing is inserted within an eye loop of a rod or linkage in the system, the elastomeric portion abuts the inner surface of the eye loop, and respective radial movement of the central bore with respect to the eye loop is possible. In this regard, radial movement of the central bore tends to compress an inner surface of the elastomeric portion toward the outer surface of the elastomeric portion, causing deformation of the elastomeric portion. The respective radial movement provides a compliant joint by deformation of the elastomeric portion within the suspension or steering system such that certain small movements are absorbed, articulation of the systems is allowed, and/or positional neutrality is maintained.

In certain suspension and steering system geometry, articulation of the various linkages can result in a degree of rotation imparted on the bushed joint. Conventional bushings conform to the rotation by the aforementioned wrapping deformation of the elastomeric portion. In this regard, wrapping deformation occurs when the inner surface of the elastomeric portion, (typically coupled to the rigid inner housing in conventional bushings), rotates with respect to the outer surface of the elastomeric portion, (typically fixed to the inner surface of the eye loop by friction). Wrapping deformation of an elastomeric bushing causes increased internal stresses and strains in the elastomeric material, leading to premature failure of the bushing, often by circumferential shearing of the elastomeric material. In many instances, an increase in the degree of wrapping deformation generally increases likelihood of failure of the elastomeric material. In certain automotive applications, particularly in high-articulating suspension systems, such as those suspension systems used in an off-road vehicle, the degree of wrapping deformation is relatively high.

The present disclosure is directed to embodiments of a bushing having a rotatable internal sleeve to provide relief from wrapping deformation of the elastomeric portion. In some embodiments, the bushing is configured to accommodate any amount of rotation of the fastening point within the eye loop of a rod or linkage. Embodiments of the bushings of the present disclosure allow rotation of the eye loop of a rod or linkage without transferring a substantial rotational force to the fastener at the mounting point, which avoids wrapping deformation of the elastomeric portion. In this regard, as will be explained in greater detail below, any minimal amount of rotational force transferred to the fastener would be a result of friction of the abutting bearing surfaces between the inner sleeve and the housing, and friction from the seals (e.g., o-rings). In the following discussion, the rotatable bushing is generally described as being utilized in conjunction with the suspension and steering systems of a vehicle, particularly during high articulation of the vehicle systems. However, in other embodiments, the bushing disclosed herein is suitably used in any bushed joint configuration, such as with other vehicles, or in boats, machines, equipment, and the like.

In some configurations, where a component of rotational force is present in the bushed joint, the embodiments of the present disclosure provide relief from wrapping deformation of the elastomeric portion by rotation of an inner sleeve with respect to a housing. The rotation of the sleeve within the housing allows the fastener in the bushed joint to maintain the desired radial compliance through compression of the elastomeric portion without causing substantial wrapping deformation of the elastomeric portion. Other improvements include a reduction of resistance to articulation of the suspension and steering systems, which allows more predictable design constraints and accurate tuning of the suspension, and allowing the rod or linkage to remain in a rotationally neutral state without potential rotational energy stored in the elastomeric portion as a result of rotational movement of bushed joint. In some instances with conventional bushings, potential rotational energy can be transferred to the elastomeric portion upon installation and torqueing of the fastener at the bushed joint.

The following discussion provides examples of bushings suitable for use in compliant joints of mechanical linkages, such as those used in suspension and steering systems of vehicles. The bushing provides at least one of an axial movement and a radial movement at the joint by deformation of the elastomeric portion while generally maintaining neutrality of other positional constraints when compliance of the joint is not required. In use, the bushing compresses in any radial direction from the central bore of the bushing, allowing compliance in the joint. The rotation of the inner sleeve with respect to the housing reduces the rotational forces tending to cause wrapping deformation of the elastomeric portion, reducing the stress and strain experienced by the elastomer during movement of the bushed joint.

Figure 1:
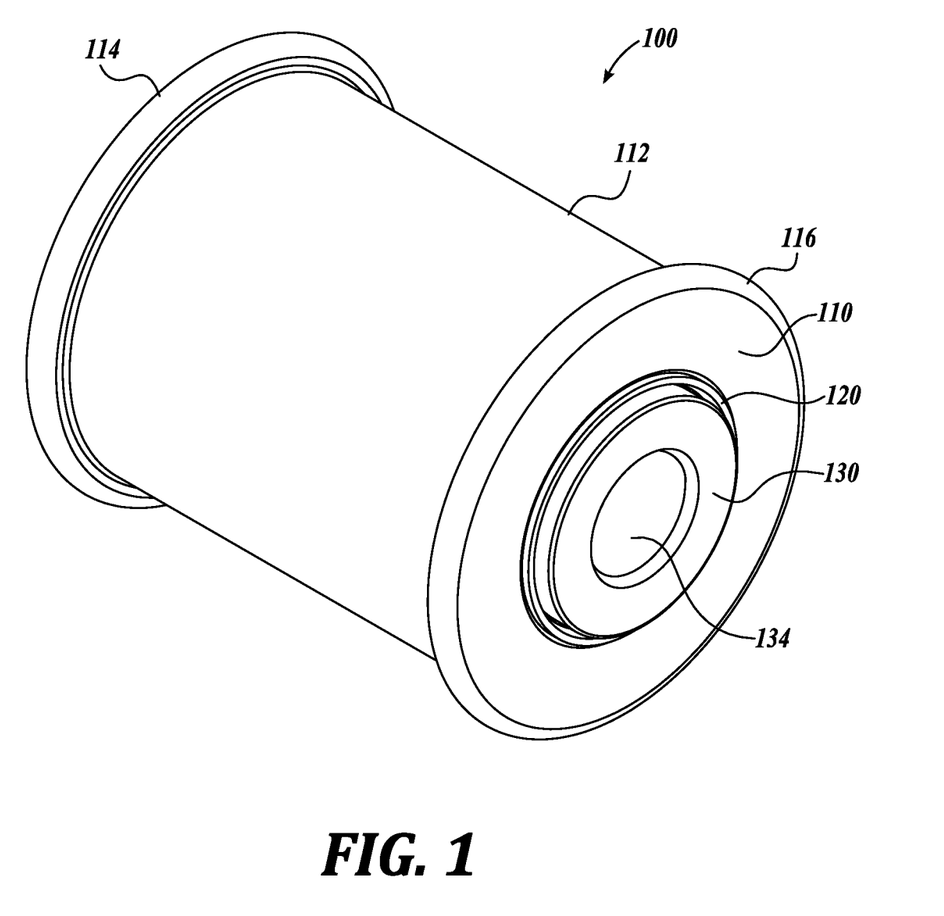
FIG. 1 is an isometric view of one representative embodiment of a bushing in accordance with an aspect of the present disclosure.

Referring to the FIGURES, an exemplary embodiment of a bushing 100 suitable for use with a compliant joint in a mechanical linkage is illustrated. Turning to FIG. 1, the bushing 100 will now be described in detail. The bushing 100 includes an elastomeric portion 110 surrounding a housing 120 and inner sleeves 130 and 132 (see FIG. 2). Although the bushing 100 is shown having two inner sleeves 130 and 132, in other embodiments, the bushing 100 includes a single sleeve or more than two sleeves.

In some embodiments, the elastomeric portion 110 may include first and second retention flanges 114 and 116 to axially retain the elastomeric portion 110 within an eye loop EL (see FIG. 4), as will be described in greater detail below. In this regard, an outer surface 112 is configured to interface an inner surface of the eye loop EL to provide a fixed connection of the elastomeric portion 110 to the eye loop EL to prevent surface slipping after the bushing 100 is installed. In some embodiments, the fixed connection between the outer surface 112 and the inner surface of the eye loop EL is maintained by friction. In other embodiments, the outer surface 112 may be coupled to the eye loop EL using adhesive, material fusion, vulcanizing, or other suitable retention methods.

Figure 2:
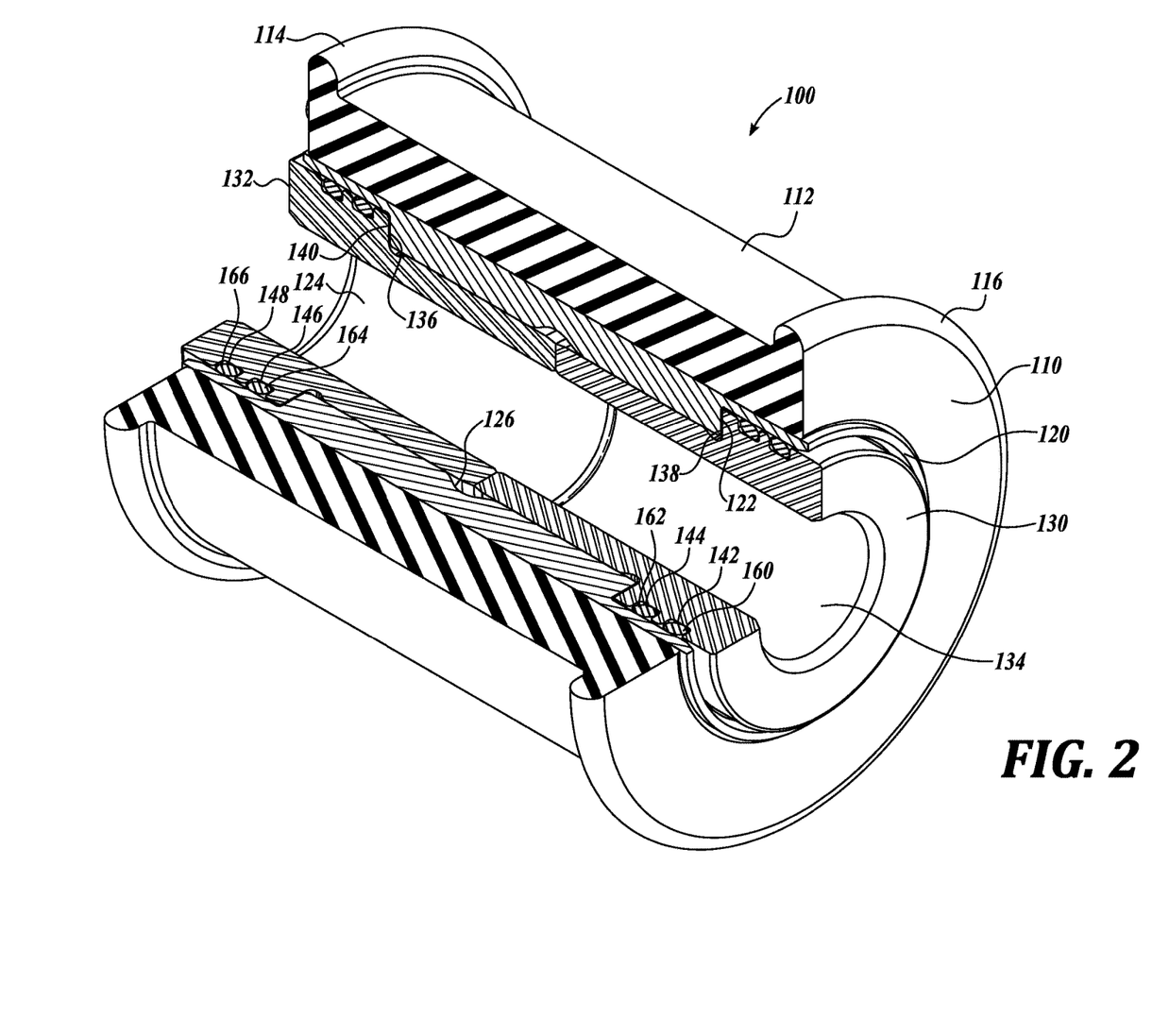
FIG. 2 is a cross-sectional isometric view of the bushing of FIG. 1.
Figure 3:
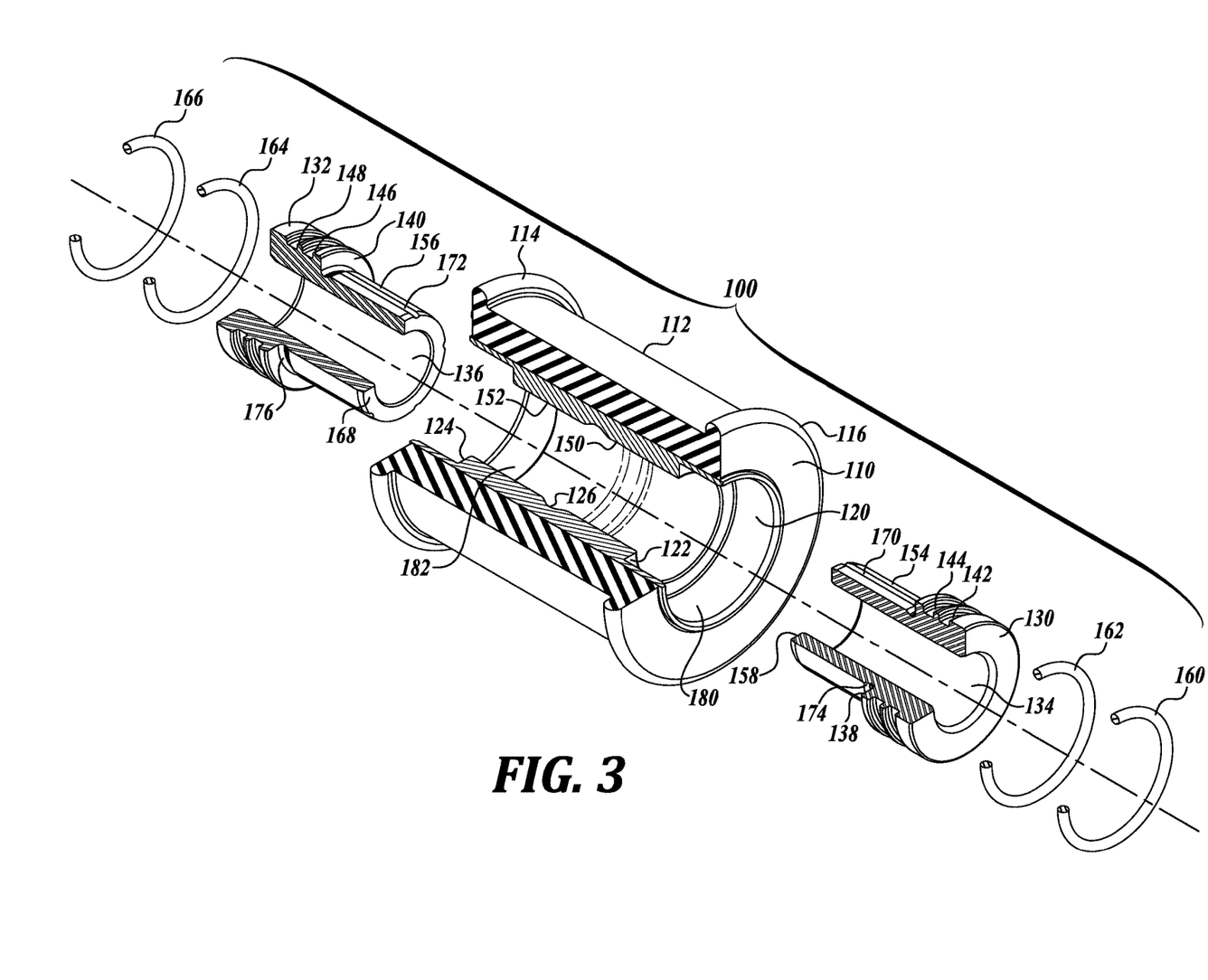
FIG. 3 is an exploded view of the bushing of FIG. 1, with a cross-sectional slice as shown in FIG. 2.

Turning to FIGS. 2 and 3, the housing 120 will now be described in detail. The housing 120 is elongate and positioned interior to the elastomeric portion 110. The housing 120 generally extends to substantially the same axial length as the elastomeric portion 110; however, in some embodiments, the housing 120 is suitably longer or shorter than the elastomeric portion 110. In the illustrated embodiment, the housing 120 is axially shorter than the combination of the first internal sleeve 130 and the second internal sleeve 132, as will be explained in greater detail below. The housing 120 is coupled to the elastomeric portion 110 by at least one of friction fit, adhesive, material fusion, vulcanizing, or any other suitable retention method. In this regard, axial rotation of the elastomeric portion 110 causes rotation of the housing 120 without slipping between the two components.

In some embodiments, the housing 120 includes a central lubrication trough 126 extending circumferentially around the inner surface of the housing 120 for the collection, retention, and distribution of lubricant (not shown). The central lubrication trough 126 is configured such that lubricant is routed and positioned in portions of the bushing 100 where rotational bearing surfaces interface. In other embodiments, any suitable lubrication system is used to prevent excessive friction and/or heat within the bushing 100 during rotation of the internal sleeves 130 and 132 with respect to the housing 120.

The housing 120 includes a first bearing surface 150 configured to closely interface a first sleeve surface 154 of the first sleeve 130, and a second bearing surface 152 configured to closely interface a second sleeve surface 156 of the second sleeve 132, the interaction of which will be explained in greater detail below. In some embodiments, the first and second sleeve surfaces 154 and 156 have an outer diameter that is less than the inner diameter of the first and second bearing surfaces 150 and 152, respectively. In some embodiments, the diameter of the first and second sleeve surfaces 154 and 156 is between about 0.0001" and 0.0100" smaller than the diameter of the first and second bearing surfaces 150 and 152, respectively. In other embodiments, the diameter of the first and second sleeve surfaces 154 and 156 is between about 0.0010" and 0.0030" smaller than the diameter of the first and second bearing surfaces 150 and 152, respectively.

The housing 120 and the first and second sleeves 130 and 132 are generally manufactured from a metallic material, such as, for example, bearing steel, stainless steel, high-carbon chromium bearing steel, carbon alloy steel, iron, titanium, and anodized aluminum; or a suitable plastic. In other embodiments, the housing 120 and first and second sleeves 130 and 132 are manufactured from any suitable material to provide axial retention of the internal sleeves 130 and 132 by the housing 120 and to retain structure in view of the clamp load of the fastener F. In some embodiments, the first and second bearing surfaces 150 and 152 of the housing 120 are coated with molybdenum disulfite to reduce friction of rotation of the sleeves 130 and 132 within the housing 120. In other embodiments, one or more suitable friction reduction treatments are applied to the first and second bearing surfaces 150 and 152 of the housing 120.

In some embodiments, the housing 120 includes a first shoulder surface 122 near a first end of the housing 120, and a second shoulder surface 124 near a second end of the housing. The shoulder surfaces 122 and 124 are configured to provide axial retention of the internal sleeves 130 and 132. In a corresponding regard, the first sleeve 130 includes a first flange portion 138 extending radially away from the first sleeve surface 154, and the second sleeve 132 includes a second flange portion 140 extending radially away from the second sleeve surface 156. Although the illustrated embodiment includes first and second sleeves 130 and 132 having first and second flange portions 138 and 140, in other embodiments, only one of the sleeves may have a flange portion. In further embodiments, the sleeves may be configured to nest, such that the sleeves overlap within the housing 120.

The first and second flange portions 138 and 140 are configured to interface the first and second shoulder surfaces 122 and 124, respectively. The interface of the first flange portion 138 with the first shoulder surface 122 prevents the first sleeve 130 from inserting deeper into the housing 120 toward the second shoulder surface 124, while the interface of the second flange portion 140 with the second shoulder surface 124 prevents the second sleeve 132 from inserting deeper into the housing 120 toward the first shoulder surface 122. Upon installation of a fastener F, as explained above, the resulting clamping force causes the first sleeve 130 to abut the second sleeve 132 such that the first and second flange portions 138 and 140 do not bind on the first and second shoulder surfaces 122 and 124. In this regard, when the first sleeve 130 abuts the second sleeve 132 in an installed configuration, the distance between the surfaces of the first and second flange portions 138 and 140 is greater than the distance between the first and second shoulder surfaces 122 and 124. In some embodiments, the distance is between about 0.001" and 0.050" greater. In further embodiments, the distance is between about 0.005" and 0.030" greater. In other embodiments, the distance is about 0.010".

As shown most clearly in FIG. 3, further lubrication of the bearing surfaces will now be explained in greater detail. As described above, the central lubrication trough 126 is configured to extend circumferentially around the housing 120 and retain an amount of lubricant for distribution to the bearing surfaces. In some embodiments, the first and second sleeves 130 and 132 include first and second axial troughs 170 and 172, respectively, which are configured to distribute lubricant from the central lubrication trough 126 in an axial direction across the first and second sleeve surfaces 154 and 156. As a result, lubricant is likewise positioned across the first and second bearing surfaces 150 and 152 during rotation of the sleeves 130 and 132 within the housing 120. In some embodiments, the first sleeve 130 includes a first circumferential trough 174 for distribution of lubricant from the first axial trough 170 to the first shoulder surface 122 and the first flange portion 138, while the second sleeve 132 includes a second circumferential trough 176 for distribution of lubricant from the second axial trough 172 to the second shoulder surface 124 and the second flange portion 140. It should be appreciated that other lubrication distribution schemes are suitable for use with the bearing 100, and are also within the scope of the present disclosure.

In some embodiments, the bearing 100 further includes sealing components to prevent the loss of lubricant and limit the ingress of contaminants and debris. In the illustrated embodiment, the first flange portion 138 includes first outer and inner channels 142 and 144 configured to retain first outer and inner o-rings 160 and 162, respectively. The first o-rings 160 and 162 seal the internal bearing surfaces of the housing 120 and the sleeves 130 and 132 by interfacing a first sealing surface 180 of the housing 120. In a similar manner, the second flange portion 140 includes second outer and inner channels 148 and 146 configured to retain second outer and inner o-rings 166 and 164, respectively. The second o-rings 166 and 164 seal the internal bearing surfaces of the housing 120 and the sleeves 130 and 132 by interfacing a second sealing surface 182 of the housing 120. Although the illustrated embodiments include o-rings 160, 162, 164, and 166 as sealing members, in other embodiments, any sealing configuration is suitably included.

Referring to the FIGURES, an exemplary embodiment of a bushing 100 suitable for use with a compliant joint in a mechanical linkage is illustrated. The bushing 100 is shown in an environmental view in FIG. 4, which depicts one exemplary embodiment of the bushing 100 installed within a bushed joint. In the environmental view, the bushing 100 is inserted or pressed into an eye loop EL such that the bushing 100 is centered therein. In some embodiments, the eye loop EL may be attached to a shank S (e.g., a threaded shank S) for further attachment to a rod or linkage in a system. In other embodiments, the eye loop EL may be formed at the end of the rod or linkage, or may comprise any suitable attachment scheme for the bushing 100. In the illustrated embodiment, the bushing 100 is fixedly retained in the eye loop EL such that the outer surface 112 of the elastomeric portion 110 of the bushing 100 does not spin with respect to the eye loop EL under normal articulation of the system. In this regard, spinning of the elastomeric member 110 may cause excessive friction and cause the elastomer to fail prematurely.

Figure 4:
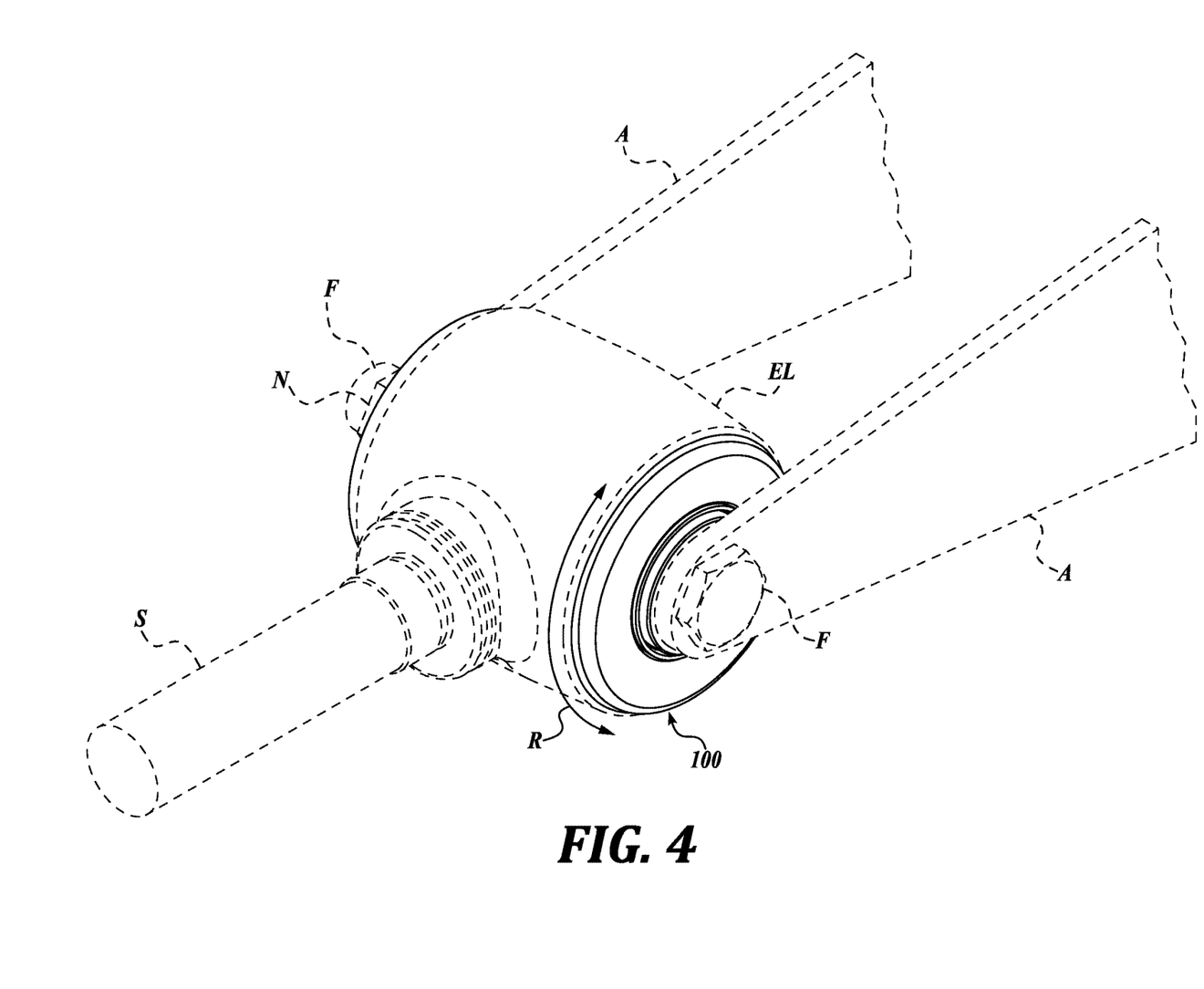
FIG. 4 is an environmental view of the bushing of FIG. 1, shown installed within an exemplary bushed joint.

In the illustrated embodiment, to complete the attachment at the bushed joint with a mounting point, a fastener F is inserted through an aperture in a mounting arm A, through a first central bore 134, a second central bore 136, and an aperture in another side of the mounting arm A. As shown, the fastener F is fixed with a nut N; however, in other embodiments, any suitable fastening scheme is used. In the illustrated configuration, the exterior surfaces of the inner sleeves 130 and 132 are proud of the elastomeric portion 110 such that the arms A do not contact the elastomeric potion 110 during rotation of the eye loop EL, as denoted by the rotational direction R.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A bushing, comprising:
   a housing having an aperture extending therethrough along an axis, the housing having an outer surface extending circumferentially about the axis;
   an elastomeric portion coupled to the outer surface of the housing; and
   a first sleeve positioned within the aperture and retained in a first axial direction, the first sleeve being rotatable about the axis with respect to the housing and the elastomeric portion, the first sleeve having a first central bore extending in the direction of the axis, wherein the first sleeve is moveable in at least one of an axial direction and a radial direction with respect to an outer surface of the elastomeric portion by deformation of the elastomeric portion.

2. The bushing of claim 1, wherein a rotational force applied to the first sleeve causes rotation of the first sleeve with respect to the housing and thereby substantially prevents wrapping deformation of the elastomeric portion by rotation of the housing and an inner surface of the elastomeric portion relative to the outer surface of the elastomeric portion.

3. The bushing of claim 1, further comprising a second sleeve having a second central bore, the second sleeve positioned within the aperture and rotatable about the axis with respect to the housing and the elastomeric portion, wherein the second sleeve is substantially retained in a second axial direction opposite the first axial direction.

4. The bushing of claim 3, wherein the first sleeve further comprises a first shoulder portion, and the housing comprises a first flange positioned within the aperture, the first shoulder abutting the first flange to retain the first sleeve in the first axial direction.

5. The bushing of claim 4, wherein the second sleeve further comprises a second shoulder portion, and the housing comprises a second flange positioned within the aperture, the second shoulder abutting the first flange to retain the second sleeve in the second axial direction.

6. The bushing of claim 5, wherein the first and second central bores are configured to receive a fastener shank therethrough such that when assembled, the first shoulder portion and the second shoulder portion retain the fastener shank in both axial directions.

7. The bushing of claim 1, further comprising a sealing ring positioned within the aperture between the first sleeve and the housing near a distal end of the first sleeve.

8. The bushing of claim 1, wherein the housing further comprises a circumferential trough configured to retain a lubricant.

9. The bushing of claim 8, wherein the sleeve further comprises an axial trough adjacent the circumferential trough, the axial trough configured to distribute the lubricant along the length of the first sleeve.

10. The bushing of claim 1, wherein the elastomeric portion comprises a material selected from the group consisting of natural rubber, synthetic rubber, ethylene propylene diene monomer, polymer, and polyurethane.

11. The bushing of claim 1, wherein the housing comprises a material selected from the group consisting of bearing steel, stainless steel, high-carbon chromium bearing steel, carbon alloy steel, iron, titanium, anodized aluminum, and plastic.

12. The bushing of claim 1, wherein the first sleeve comprises a material selected from the group consisting of bearing steel, stainless steel, high-carbon chromium bearing steel, carbon alloy steel, iron, titanium, anodized aluminum, and plastic.

13. A rotatable bushing, comprising:
a housing having an aperture extending therethrough along an axis, the housing having an outer surface extending circumferentially about the axis;
an elastomeric portion coupled to the outer surface of the housing;
a first sleeve positioned within the aperture and retained in a first axial direction, the first sleeve being rotatable about the axis with respect to the housing and the elastomeric portion, the first sleeve having a first central bore extending in the direction of the axis, wherein the first sleeve is moveable in at least one of an axial direction and a radial direction with respect to an outer surface of the elastomeric portion by deformation of the elastomeric portion; and
a joining member having an eye loop surrounding the outer surface of the elastomeric portion, wherein a rotational force applied to the first sleeve causes rotation of the first sleeve with respect to the housing and thereby substantially prevents wrapping deformation of the elastomeric portion by rotation of the housing and an interior surface of the elastomeric portion relative to the outer surface of the elastomeric portion and the joining member.

14. The bushing of claim 13, further comprising a second sleeve having a second central bore, the second sleeve positioned within the aperture and rotatable about the axis with respect to the housing, the elastomeric portion, and the joining member, wherein the second sleeve is substantially retained in a second axial direction opposite the first axial direction.

15. The bushing of claim 14, wherein the first sleeve further comprises a first shoulder portion, and the housing comprises a first flange positioned within the aperture, the first shoulder abutting the first flange to retain the first sleeve in the first axial direction, and wherein the second sleeve further comprises a second shoulder portion, and the housing comprises a second flange positioned within the aperture, the second shoulder abutting the second flange to retain the second sleeve in the second axial direction.

16. The bushing of claim 15, wherein the first and second central bores are configured to receive a fastener shank therethrough such that when assembled, the first shoulder portion and the second shoulder portion retain the fastener shank in both axial directions.

17. The bushing of claim 13, wherein the housing further comprises a circumferential trough configured to retain a lubricant and the sleeve further comprises an axial trough adjacent the circumferential trough, the axial trough configured to distribute the lubricant along the length of the first sleeve.

18. The bushing of claim 13, wherein the elastomeric portion comprises a material selected from the group consisting of natural rubber, synthetic rubber, ethylene propylene diene monomer, polymer, and polyurethane.

19. The bushing of claim 13, wherein the housing and first sleeve comprise materials selected from the group consisting of bearing steel, stainless steel, high-carbon chromium bearing steel, carbon alloy steel, iron, titanium, anodized aluminum, and plastic.

20. The bushing of claim 13, further comprising a sealing ring positioned within the aperture between the first sleeve and the housing near a distal end of the first sleeve.

* * * * *